United States Patent Office 3,145,216
Patented Aug. 18, 1964

3,145,216
FRIEDEL-CRAFTS KETONE SYNTHESIS
George A. Olah, Sarnia, Ontario, Canada, assignor to The Dow Chemical Company, Midland, Mich., a corporation of Delaware
No Drawing. Filed Aug. 20, 1962, Ser. No. 218,142
20 Claims. (Cl. 260—332.3)

This invention relates to an improved process for preparing ketones in the presence of Friedel-Crafts catalysts. Specifically, the invention relates to a process for preparing ketones having the formula:

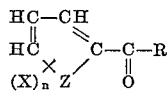

wherein Z represents either a chalcogen having an atomic number from 8 to 16 or the —C=C— radical, R represents an alkyl or phenyl group, X is either a halogen having an atomic number from 9 to 17 or an alkyl group, and $n$ is an integer from 0 to 3. A preferred sub-genus is that wherein any alkyl groups are lower alkyl groups, i.e., they contain from 1 to about 4 carbon atoms.

The novel process is conveniently practiced by reacting by contacting a cyclic compound having the formula:

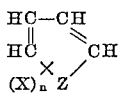

wherein Z, X, and $n$ have the same values as previously described, with a thiocyanate having the formula:

wherein R has the same significance as previously described, in the presence of a Friedel-Crafts type catalyst. The thus-formed product is easily separated from the reaction mixture by conventional procedures such as by distillation.

The preferred temperature for the reaction will vary somewhat depending on the particular system being used. Generally, however, the temperature is maintained between about 20° and 80° C.

Friedel-Crafts type catalysts, in general, are operable in this novel process. Specific catalysts that have been found to give excellent results are aluminum chloride, boron trifluoride, and zinc chloride. Other catalysts that can be used are aluminum bromide and hydrogen fluoride.

The catalyst is suitably employed in the proportions of from 1 to about 2 moles of catalyst and from 2 to about 5 moles of the cyclic compound per mole of thiocyanate, preferably from 1.1 to about 1.5 moles of catalyst and 2–3 moles of cyclic compound per mole of thiocyanate.

The process of the present invention is easily carried out in from 2 to 4 hours and results in very good yields of the desired products.

The practice of the present invention is illustrated by a series of experiments in each of which 2 moles of the cyclic compound and 0.5 mole of the acyl thiocyanate, each of the respective genera previously described, were reacted in the presence of 1.0 mole of a Friedel-Crafts type catalyst. The reactions were run for a period of several hours, the product washed with water and separated by distillation and the yield calculated. There are shown in Table I for each experiment conducted, the acyl thiocyanate, cyclic compound, and catalyst used, the reaction temperature, the product, the yield obtained, based on the starting materials employed, and the boiling point and/or melting point in ° C., and the refractive index.

Table 1

| Exp. No. | Acyl Thiocyanate | Cyclic Compound | Catalyst | Temp., °C. | Product Name | Yield, Percent | |
|---|---|---|---|---|---|---|---|
| 1 | Acetyl | Benzene | AlCl₃ | 25 | Acetophenone | 56 | B.P. 200–202°, $n_D^{20}$=1.5336. |
| 2 | do | Toluene | BF₃ | 25 | p-Methylacetophenone | 53 | B.P. 225–226°, $n_D^{20}$=1.5332. |
| 3 | do | Fluorobenzene | BF₃ | 25 | p-Fluoroacetophenone | 38 | B.P. 78–80°/112 mm., $n_D^{25}$=1.5081. |
| 4 | do | Toluene | ZnCl₂ | 40 | p-Methylacetophenone | 43 | B.P. 225–226°, $n_D^{20}$=1.5332. |
| 5 | Propionyl | do | AlCl₃ | 25 | p-Methylpropiophenone | 55 | B.P. 110–112/127 mm., $n_D^{20}$=1.5276. |
| 6 | Benzoyl | Benzene | AlCl₃ | 35 | Benzophenone | 57 | B.P. 303–305°, M.P. 48–49°. |
| 7 | Acetyl | Furan | BF₃ | 25 | 2-Acetyl furan | 61 | B.P. 168–169°, $n_D^{20}$=1.5015. |
| 8 | do | Thiophene | BF₃ | 25 | 2-Acetyl thiophene | 56 | B.P. 212–213°, $n_D^{20}$=1.5665. |

In addition to those compounds specifically disclosed, other ketones within the scope of the present invention can be prepared from analogous starting materials, such as 2-chlorophenyl ethyl ketone, 2-fluoro-4-chlorophenyl propyl ketone, 2,4-dichloro-5-fluorophenyl n-butyl ketone, 2-ethyl-4-chlorophenyl n-hexyl ketone, 2-chloro-4,5-dimethylphenyl n-octyl ketone, 2,5-diethyl-3-fluorophenyl n-dodecyl ketone, 2-n-propyl-4,5-dichloro n-octadecyl ketone, 2,3-dichlorofuryl ethyl ketone, 2-chloro-4-fluorofuryl n-amyl ketone, 2-methyl-4-ethylfuryl n-octyl ketone, 3,4-di-n-propylfuryl n-dodecyl ketone, 2-chloro-4-methylthiophenyl ethyl ketone, 2-fluoro-3-ethylthiophenyl n-heptyl ketone, 2,3-dichlorothiophenyl n-dodecyl ketone, and 3,4-di-n-propylthiophenyl hexadecyl ketone.

I claim:
1. A process for preparing ketones having the formula:

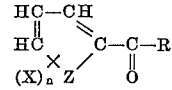

wherein Z represents a member selected from the group consisting of chalcogens having an atomic number from 8 to 16 and the radical —C=C—, R is a member selected from the class consisting of alkyl and phenyl, X represents a member selected from the group consisting of halogens having an atomic number from 9 to 17 and alkyl, and $n$ is an integer from 0 to 3, said process comprising reacting by contacting a cyclic compound having the formula:

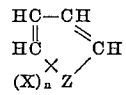

wherein Z, X and $n$ have the same values as previously described, with a thiocyanate having the formula:

wherein R has the same value as previous desecribed, in the presence of a Friedel-Crafts catalyst, and separating the thus-formed compound from the reaction mixture.

2. A process as in claim 1 wherein the cyclic compound has the formula

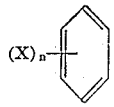

and each X and R is alkyl.

3. A process as in claim 2 wherein the cyclic compound is toluene.

4. A process as in claim 1 wherein the cyclic compound is a halobenzene and R is alkyl.

5. A process as in claim 1 wherein the cyclic compound is furan and R is alkyl.

6. A process as in claim 1 wherein the cyclic compound is thiophene and R is alkyl.

7. A process as in claim 2 wherein R is methyl.

8. A process as in claim 2 wherein R is ethyl.

9. A process as in claim 1 wherein R is phenyl, the cyclic compound has the formula

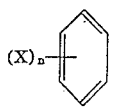

and each X is alkyl.

10. A process as in claim 1 wherein the catalyst is aluminum chloride.

11. A process as in claim 1 wherein the catalyst is boron trifluoride.

12. A process as in claim 1 wherein the catalyst is zinc chloride.

13. A process as in claim 1 wherein the reaction is conducted at a temperature of about 20° to 80° C.

14. A process for preparing acetophenone comprising reacting by contacting benzene with acetyl thiocyanate in the presence of a Friedel-Crafts catalyst.

15. A process for preparing p-methyl acetophenone comprising reacting by contacting toluene with acetyl thiocyanate in the presence of a Friedel-Crafts catalyst.

16. A process for preparing p-fluoro acetophenone comprising reacting by contacting fluorobenzene with acetyl thiocyanate in the presence of a Friedel-Crafts catalyst.

17. A process for preparing p-methyl propiophenone comprising reacting by contacting toluene with propionyl thiocyanate in the presence of a Friedel-Crafts catalyst.

18. A process for preparing benzophenone comprising reacting by contacting benzene with benzoyl thiocyanate in the presence of a Friedel-Crafts catalyst.

19. A process for preparing 2-acetyl furan comprising reacting by contacting furan with acetyl thiocyanate in the presence of a Friedel-Crafts catalyst.

20. A process for preparing 2-acetyl thiophene comprising reacting by contacting thiophene with acetyl thiocyanate in the presence of a Friedel-Crafts catalyst.

References Cited in the file of this patent

UNITED STATES PATENTS 2,492,629     Hartough et al. _____ Dec. 27, 1949

OTHER REFERENCES

Hoggarth: J. Chem. Soc., London, Part I, 1949, pp. 1160–63.

Hoggarth: J. Chem. Soc., London, Part II, 1949, pp. 1163–67.

Fieser: Organic Chemistry, third edition, 1956, pp. 540–3.

Zeavins et al.: J. Amer. Chem. Soc., vol. 54, 1932, pp. 3738–42.

Williams et al.: J. Amer. Chem. Soc., vol. 63, 1941, pp. 2510–11.

UNITED STATES PATENT OFFICE
CERTIFICATE OF CORRECTION

Patent No. 3,145,216　　　　　　　　　　　　August 18, 1964

George A. Olah

It is hereby certified that error appears in the above numbered patent requiring correction and that the said Letters Patent should read as corrected below.

Column 2, line 19, strike out "cyanate, preferably from 1.1 to about 1.5 moles of cat-" and insert the same before "alyst" in line 1, same column 2.

Signed and sealed this 15th day of December 1964.

(SEAL)
Attest:

ERNEST W. SWIDER
Attesting Officer

EDWARD J. BRENNER
Commissioner of Patents